United States Patent [19]
Kobayashi et al.

[11] Patent Number: 5,656,675
[45] Date of Patent: Aug. 12, 1997

[54] AUTOMOTIVE MOLDED ROOF MATERIAL AND PROCESS FOR PRODUCING THE SAME

[75] Inventors: Toshio Kobayashi; Keinosuke Morita; Seishi Suzuki, all of Ichihara, Japan

[73] Assignee: Mitsui Petrochemical Industries, Ltd., Tokyo, Japan

[21] Appl. No.: 555,203

[22] Filed: Nov. 8, 1995

[30] Foreign Application Priority Data

Nov. 9, 1994 [JP] Japan ..................... 6-275409

[51] Int. Cl.$^6$ ........................................ C08J 9/04
[52] U.S. Cl. .................. 521/79; 156/79; 264/46.1; 264/176.1; 264/211.21; 264/271.1; 428/424.8; 521/143; 521/144; 521/915
[58] Field of Search .................. 264/46.1, 176.1, 264/211.21, 271.1; 428/424.8; 521/79, 143, 144, 915; 156/79

[56] References Cited

U.S. PATENT DOCUMENTS

| | | |
|---|---|---|
| 4,128,606 | 12/1978 | Furutachi et al. . |
| 5,176,953 | 1/1993 | Jacoby et al. ..................... 521/143 |
| 5,180,751 | 1/1993 | Park et al. ..................... 521/143 |

FOREIGN PATENT DOCUMENTS

| | | |
|---|---|---|
| 0291764 | 11/1988 | European Pat. Off. . |
| 1566391 | 4/1980 | United Kingdom . |
| 2179049 | 2/1987 | United Kingdom . |

OTHER PUBLICATIONS

Abstract of Japanese Laid–Open Patent Publication No. 5-70621.

English abstract of Japanese Laid–Open Patent Application No. 5-70621 (Mar. 23, 1993).

Primary Examiner—Samuel A. Acquah
Assistant Examiner—John M. Cooney, Jr.
Attorney, Agent, or Firm—Sherman and Shalloway

[57] ABSTRACT

A process for producing an automotive molded roof material is provided which comprises sheeting a foamable sheet forming composition comprising a specified propylene resin, a glass fiber, a radical initiator, a crosslinking auxiliary and a foaming agent in specific proportions into a foamable sheet, lining one side of the foamable sheet with a backing sheet so as to integrate these and irradiating the foamable sheet with ionizing radiation to thereby crosslink the propylene resin, followed by heating the foamable sheet so as to cause the foamable sheet to foam, placing a cover sheet on the other side of the foamed sheet before the sheet cools to solidify and press molding the cover sheet on the foamed sheet to cover. There is also provided an automotive molded roof material produced by the above process. An automotive molded roof material is obtained which can be recycled, is lightweight and has high rigidity.

10 Claims, No Drawings

AUTOMOTIVE MOLDED ROOF MATERIAL AND PROCESS FOR PRODUCING THE SAME

FIELD OF THE INVENTION

The present invention relates to an automotive molded roof material and a process for producing the same. More particularly, the present invention is concerned with an automotive molded roof material comprised of a foamed polypropylene molding product which is lightweight, has rigidity and can be recycled and with a process for producing the same.

BACKGROUND OF THE INVENTION

Foams composed of polypropylene and other propylene resins are generally excellent in properties such as heat resistance, strength and rigidity as compared with those of polyethylene foam, so that the use thereof is expanding in the fields of high-temperature heat insulators, packaging materials, building materials and lightweight structural materials.

The conventional polypropylene foam has an expansion ratio as high as 15 to 40 and is a soft foam composed mainly of a soft propylene random copolymer. However, the polypropylene foam is required to be lightweight and have high rigidity for use in automotive interior finish base materials (aggregate).

A variety of base materials are known for use as automotive interior finish base materials, for example, automotive roof base materials, which include a corrugated paper board, a composite material of polyurethane foam containing a glass fiber, a resin felt composed of a fiber sheet and a thermosetting resin bound together, a material composed mainly of a glass fiber with the use of polyethylene or polypropylene as a binder and Dylark (trade name) comprised of polystyrene foam.

However, all the above base materials have respective merits and demerits and none of them satisfies all the requirements on the properties of the automotive molded roof material which include that it must be lightweight, that its rigidity must be high, that it must have excellent dimensional stability, that its acoustic characteristic must be excellent, that its cost must be low, that it must have freedom in molding, that it must be free from environmental pollution when molding, that it can be recycled (recyclability), that its design variation must be wide (designability) and that it can be easily mounted. In particular, greater importance would be placed in the future on the recyclability from the viewpoint of the global environment problem. At the present time, although some base materials for use as automotive roof materials are known which satisfy the recyclability requirement, they have not acquired the mainstream status because of their other problems.

Japanese Patent Laid-open Publication No. 5(1993)-70621 proposed the following process for producing a foamed polypropylene molding product. That is, the process for producing a foamed polypropylene molding product comprises sheeting a foamable sheet forming composition comprising a propylene resin composed of a propylene block copolymer, a radical initiator, a crosslinking auxiliary and a foaming agent at a temperature at which the foaming agent does not decompose into a foamable sheet, lining one side of the resultant foamable sheet with a backing sheet or laminating a cover sheet having the function of a backing sheet thereto so as to integrate these and irradiating the foamable sheet with ionizing radiation to thereby crosslink the propylene resin, followed by heating the foamable sheet so as to cause the same to foam and simultaneously effecting molding thereof. This process produces a composite foamed molding product which is lightweight, having a level of strength barely enabling use as a base material (aggregate) and high rigidity, and which is suitable for use as an interior finish base material in automobiles and the like. The above publication describes that, for example, a trunk room material and a door trim can be obtained by the above process, however, the cover sheet suffers from fur collapse in the case of a fur-transplanted cover sheet (e.g., a fuzzy sheet and velvet), so that the feeling of the surface of the foamed molding product is not always satisfactory.

Therefore, the development is desired of a process capable of producing an inexpensive automotive molded roof material which not only is lightweight, having high rigidity, and excellent in dimensional stability, acoustic characteristic, molding environment, designability, skin surface feeling, mounting workability and recyclability but also ensures molding freedom.

OBJECT OF THE INVENTION

The present invention has been made with a view toward solving the above problems of the prior art. Thus, the object of the present invention is to provide an inexpensive automotive molded roof material which not only is lightweight, having high rigidity, and excellent in dimensional stability, acoustic characteristic, molding environment, designability, skin surface feeling, mounting workability and recyclability but also ensures molding freedom and to provide a process for producing the same.

SUMMARY OF THE INVENTION

The process for producing an automotive molded roof material according to the present invention comprises i) forming into a sheet a foamable sheet forming composition comprising 75 to 95 parts by weight of a propylene resin (A) which is (a) a propylene block copolymer (A-1) comprising from 1.5 to less than 9% by weight of an ethylene/propylene copolymer segment and from more than 91 to 98.5% by weight of a crystalline polypropylene segment, said ethylene/propylene copolymer segment having an intrinsic viscosity ($\eta$) of 2 to 8 dl/g as measured in Decalin (decahydronaphthalene—product of E. I. duPont deNemours & Co.) 135° C., said propylene block copolymer (A-1) having an ethylene content of from 1.5 to less than 9 mol%; or (b) a propylene resin composition (A-4) comprising from 15 to less than 30 parts by weight of a propylene block copolymer (A-2) and from more than 70 to 85 parts by weight of a propylene polymer (A-3) in a proportion such that the components (A-2) and (A-3) total 100 parts by weight, wherein said propylene block copolymer (A-2) comprises 10 to 30% by weight of an ethylene/propylene copolymer segment and 70 to 90% by weight of a crystalline polypropylene segment, said ethylene/propylene copolymer segment having an intrinsic viscosity ($\eta$) of 2 to 8 dl/g as measured in Decalin (decahydronaphthalene—product of E. I. duPont deNemours & Co.) at 135° C., said propylene block copolymer (A-2) having an ethylene content of 10 to 30 mol %, and said propylene polymer (A-3) has a melt flow rate of 0.5 to 20 g/10 min as measured at 230° C. under a load of 2.16 kg in accordance with ASTM D-1238 L; and 5 to 25 parts by weight of a glass fiber (B) in a proportion such that the components (A) and (B) total 100 parts by weight, said foamable sheet forming composition further comprising 0.01 to 0.1 part by weight of a radical initiator (C), 0.1 to 5 parts by weight of a crosslinking auxiliary (D) and 2 to 5 parts by weight of a foaming agent (E) per 100 parts by weight of the total of the propylene resin (A) and glass fiber (B), at a temperature at which the foaming agent (E) does not decompose;

ii) contacting one side of the resultant foamable sheet with a backing sheet so as to integrate the foamable sheet with the backing sheet;

iii) irradiating the foamable sheet with ionizing radiation to crosslink the propylene resin (A);

iv) thereafter heating the foamable sheet so as to cause the foamable sheet to foam;

v) placing a cover sheet on the other side of the foamed sheet before the foamed sheet cools to solidify; and vi) press molding the cover sheet on the foamed sheet to cover.

The above crystalline polypropylene segment preferably comprises 80 to 100% by weight of a crystalline polypropylene and 0 to 20% by weight of a crystalline polyethylene.

The automotive molded roof material according to the present invention comprises a crosslinked foamed sheet comprising 75 to 95 parts by weight of propylene resin (A) which is (a) a propylene block copolymer (A-1) or (b) a propylene resin composition (A4) and 5 to 25 parts by weight of a glass fiber (B) in a proportion such that the components (A) and (B) total 100 parts by weight, said crosslinked foamed sheet having a gel fraction from 1 to 10% by weight based on the weight of the propylene resin (A) and having foam arranged mainly along the direction of the thickness of the sheet at an expansion ratio of 5 to 10.

DETAILED DESCRIPTION OF THE INVENTION

The automotive molded roof material and the process for producing the same according to the present invention will concretely be described below.

First, a description will be given of the foamable sheet forming composition for use in the production of the automotive molded roof material according to the present invention.

Foamable Sheet Forming Composition

The foamable sheet forming composition for use in the present invention comprises a propylene resin (A), a glass fiber (B), a radical initiator (C), a crosslinking auxiliary (D) and a foaming agent (E) together with additives such as a heat stabilizer and occasionally a colorant.

The propylene resin (A) to be employed in the present invention may be either a propylene block copolymer (A-1) of the so-called non-polymer-blend type (i.e.,chemical-blend type), or a propylene resin composition (A-4) composed of a propylene block copolymer (A-2) and a propylene polymer (A-3) of one of the polymer blend type.

The propylene block copolymer (A-1) employed as the propylene resin (A) in the present invention is specifically a propylene block copolymer comprising from 1.5 to less than 9% by weight of an ethylene/propylene copolymer segment and from more than 91 to 98.5% by weight of a crystalline polypropylene segment. The ethylene/propylene copolymer segment has an intrinsic viscosity ($\eta$) of 2 to 8 dl/g and preferably 3 to 6 dl/g as measured in Decalin (decahydronaphthalene—product of E. I. duPont deNemours & Co.) at 135° C. The ethylene/propylene copolymer segment is low-crystalline and has rubbery properties.

In the present invention, the crystalline polypropylene segment may contain a small amount of a crystalline polyethylene, with the proviso that the object of the present invention is not deteriorated. In particular, the crystalline polypropylene segment comprises 80 to 100% by weight of a crystalline polypropylene and 0 to 20% by weight of a crystalline polyethylene. Further, the crystalline polypropylene and crystalline polyethylene may contain a minute amount of monomeric units of an α-olefin component such as ethylene and propylene. For example, the crystalline polypropylene may contain a minute amount of ethylene, whereas the crystalline polyethylene may contain a minute amount of propylene.

The ethylene content of the propylene block copolymer (A-1) ranges from 1.5 to less than 9 mol %.

When the propylene block copolymer (A-1) whose ethylene content is within the above range is used as the propylene resin (A), a foamable sheet forming composition can be obtained which enables conducting the crosslinking of the propylene resin by ionizing radiation to the extent of a desired crosslinking degree, so that the sheet can be foamed by heating mainly along the direction of the thickness thereof with the result that a foamed sheet of at least 3 mm in thickness can be provided at an expansion ratio of 5 to 10.

In the present invention, the ethylene/propylene copolymer segment composing the propylene block copolymer is indispensable for obtaining a uniform foam.

The propylene block copolymer (A-1) may be obtained by polymerizing an olefin in a single polymerization reaction system in the presence of a stereospecific catalyst, preferably a catalyst comprising a carrier-supported transition metal compound and an organoaluminum compound. For example, the propylene block copolymer is obtained by first step of homopolymerizing propylene, and then random copolymerizing propylene and ethylene and, optionally, polymerizing ethylene in the same or separate polymerization reaction system. The block copolymer obtained by this process is a copolymer of the so-called non-polymer-blend type or chemical-blend type. That is, by the multistep polymerization, crystalline polypropylene, ethylene/propylene random copolymer and crystalline polyethylene are formed into a blended state in situ in the polymerization reaction system. A detailed description of the concrete procedure of the process is given in BP 1,566,391 and U.S. Pat. No. 4,128,606 whose applicant is the same as that of the priority application of the present invention.

The propylene resin (A) may be a propylene resin composition (A-4) obtained by blending a propylene block copolymer (A-2) with a propylene polymer (A-3) as described later.

The propylene block copolymer (A-2) for use in the above propylene resin composition (A-4) is specifically a propylene block copolymer comprising 10 to 30% by weight and preferably 10 to 20% by weight of an ethylene/propylene copolymer segment and 70 to 90% by weight and preferably 80 to 90% by weight of a crystalline polypropylene segment. The ethylene/propylene copolymer segment has an intrinsic viscosity ($\eta$) of 2 to 8 dl/g and preferably 3 to 6 dl/g as measured in Decalin (decahydronaphthalene—product of E. I. duPont deNemours & Co.) at 135° C.

In the present invention, the crystalline polypropylene segment may contain a small amount of a crystalline polyethylene, with the proviso that the object of the present invention is not deteriorated. In particular, the crystalline polypropylene segment comprises 80 to 100% by weight of the crystalline polypropylene and 0 to 20% by weight of the crystalline polyethylene. Further, the crystalline polypropylene and crystalline polyethylene may contain a minute amount of monomeric units of an α-olefin component such as ethylene and propylene. For example, the crystalline polypropylene may contain a minute amount of ethylene, whereas the crystalline polyethylene may contain a minute amount of propylene.

The ethylene content of the propylene block copolymer (A-2) ranges from 10 to 30 mol % and preferably from 15 to 25 mol %.

When the propylene block copolymer whose ethylene content is within the above range is used, a foamable sheet forming composition can be obtained which enables conducting the crosslinking of the propylene resin by ionizing radiation to the extent of a desired crosslinking degree, so that the sheet can be foamed by heating mainly along the direction of the thickness thereof with the result that a foamed sheet of at least 3 mm in thickness can be provided at an expansion ratio of 5 to 10.

The melt flow rate (MFR: measured at 230° C. under a load of 2.16 kg in accordance with ASTM D-1238, L) of the above propylene block copolymer ranges from 0.5 to 20 g/10 min and preferably from 1 to 10 g/10 min.

The propylene resin composition (A-4) comprises from 15 to less than 30 parts by weight and preferably from 20 to less than 30 parts by weight of a propylene block copolymer (A-2) and from more than 70 to 85 parts by weight and preferably from more than 70 to 80 parts by weight of a propylene polymer (A-3) in a proportion such that the components (A-2) and (A-3) total 100 parts by weight.

The melt flow rate (MFR: measured at 230° C. under a load of 2.16 kg in accordance with ASTM D-1238, L) of the propylene polymer employed in combination with the propylene block copolymer ranges from 0.5 to 20 g/10 min and preferably from 1 to 10 g/10 min.

The propylene resin (A) for use in the present invention, specifically, the propylene block copolymer (A-1) or the propylene resin composition (A-4) has a melt flow rate (MFR: measured at 230° C. under a load of 2.16 kg in accordance with ASTM D 1238, L) ranging from 0.5 to 20 g/10 min and preferably from 1.0 to 10 g/10 min. When the melt flow rate of the propylene resin (A) is within the above range, mixing and extrusion are easy and high mechanical strength is maintained in a small amount of added crosslinking auxiliary, so that the material is suitable for practical use as a roof material.

The above propylene resin (A) is added in an amount of 75 to 95 parts by weight and preferably 80 to 90 parts by weight per 100 parts by weight of the total of the propylene resin (A) and glass fiber (B).

The glass fiber (B) for use in the present invention has an average fiber diameter generally ranging from 5 to 20 μm and preferably from 10 to 15 μm and a fiber length ranging from 0.1 to 20 mm and preferably from 0.3 to 10 mm.

The glass fiber (B) is added in an amount of 5 to 25 parts by weight and preferably 10 to 20 parts by weight per 100 parts by weight of the total of the propylene resin (A) and glass fiber (B).

The addition of the glass fiber (B) in the above amount enables production of a foamable sheet capable of providing an automotive molded roof material which is highly rigid and has excellent heat resistance and dimensional stability. Although any automotive molded roof material is required not to have a sag of 10 mm or greater in a wet thermal test conducted at temperatures varied within the range of 90° to −40° C., this requirement is satisfied by the use of the above glass fiber (B). Further, talc is available at low cost and has most frequently been used as a filler suitable for improving the rigidity of the roof material. However, not only the rigidity but also the heat resistance of the roof material must be improved, so that the amount of added talc becomes too large with the unfavorable result that the weight of the obtained roof material is too large and that the foaming property of the foamable sheet becomes poor. The above drawbacks attributed to the use of talc can be resolved by the employment of the above glass fiber (B).

In the present invention, it is preferred that an appropriate amount of a modified polypropylene, of which polypropylene is graft modified with unsaturated carboxylic acid or derivative thereof which is able to radical polymerization, be coated directly to the glass fiber (B) or be added to the propylene resin (A) from the improvement of the adherence between the glass fiber (B) and the propylene resin (A).

Concrete examples of unsaturated carboxylic acid used for modifying polypropylene include acrylic acid, methacrylic acid, maleic acid, fumaric acid, itaconic acid, citraconic acid, crotonic acid, and endocis-bicyclo[2,2,1]hept-5-ene-2,3-dicarboxylic acid (Nadic Acid™). As the derivatives of the above, there are mentioned acid halide, ester, amide, imide, and anhydride; and the concrete examples of the above derivatives include maleimide, amide acrylate, amide methacrylate, glycidyl methacrylate, maleic anhydride, citraconic anhydride, monomethyl maleate, dimethyl maleate, and glycidyl maleate. These may be used singly or in combination with two or more. Among these, maleic anhydride, acrylic acid and methacrylic acid are preferably used.

For example, a modified polypropylene graft-polymerized with maleic anhydride is adhered by impregnating in a liquid state or coated in a molten state to a glass fiber (B). In this case, the amount of the unsaturated carboxylic acid or derivatives thereof is in the range of 0.01 to 10% by weight and preferably 0.1 to 5% by weight, based on the weight of the polypropylene. Furthermore, a modified polypropylene which is highly graft-polymerized with the unsaturated carboxylic acid or derivative thereof may be diluted with an unmodified polypropylene to a concentration within the above range. From the viewpoint of the improved mixing of the modified polypropylene and other components in the formation of a foamable sheet, it is preferred that a master batch be prepared in advance by mixing the thus surface-treated glass fiber (B) and a propylene resin (A) in a weight ratio of 60/40 to 80/20. It is still preferred that the shape of the master batch have a length of about 10 mm and a diameter of about 3 mm.

Besides, in determining a blending proportion of the propylene resin (A) with other components, an amount of the glass fiber (B) before coating with the above modified polypropylene, not an amount of the modified polypropylene, needs to be calculated.

Organic peroxides and organic peroxyesters are mainly used as the radical initiator (C) for converting the foamable sheet forming composition to the state of having been crosslinked. It is preferred that the decomposition temperature at which a half-life of the above radical initiator (C) becomes 1 minute be higher than the melting point of the propylene resin (A). Further, it is preferred from the practical point of view that the decomposition temperature at which a half-life of the above radical initiator (C) becomes 100 hours be not lower than 40° C.

Examples of the above organic peroxides and organic peroxyesters include 3,5,5-trimethylhexanoyl peroxide (1), octanoyl peroxide (2), decanoyl peroxide (3), lauroyl peroxide (4), succinoyl peroxide (5), acetyl peroxide (6), t-butyl peroxy(2-ethylhexanoate) (7), m-toluoyl peroxide (8), benzoyl peroxide (9), t-butyl peroxyisobutylate (10), 1,1-bis(t-butylperoxy)-3,5,5-trimethylcyclohexane (11), 1,1-bis(t-butylperoxy) cyclo-hexane (12), t-butylperoxymaleic acid (13), t-butyl peroxylaurate (14), t-butyl peroxy-3,5,5-trimethylcyclohexanoate (15), cyclohexanone peroxide (16), t-butyl peroxyisopropyl carbonate (17), 2,5-dimethyl-2,5-di(benzoylperoxy)hexane (18), t-butyl peroxyacetate (19), 2,2-bis (t-butylperoxy) butane (20), t-butyl peroxybenzoate (21), n-butyl-4,4-bis (t-butylperoxy) valerate (22) , di-t-butyl peroxyisophthalate (23), methyl ethyl ketone peroxide (24), α,α'-bis(t-butylperoxyisopropyl) benzene (25), dicumyl peroxide (26), 2,5-dimethyl-2,5-di(t-butylperoxy) hexane (27), t-butyl cumyl peroxide (28), diisopropylbenzene hydroperoxide (29), di-t-butyl peroxide (30), p-menthane hydroperoxide (31), 2,5-dimethyl-2,5-di(t-butylperoxy)hexyne-3 (32), 1,1,3,3-tetramethylbutylhydroperoxide (33), 2,5-dimethylhexane-2,5-dihydroperoxide (34), cumene hydroperoxide (35) and t-butyl hydroperoxide (36). Of these, the compounds (12) to (36) are preferred.

The above radical initiator (C) is contained in the foamable sheet forming composition for use in the present invention in an amount of 0.01 to 0.1 part by weight per 100 parts by weight of the total of the propylene resin (A) and glass fiber (B). When the amount of the radical initiator (C) is within the above range, an appropriate increase of viscoelasticity at a molten state is attained for the propylene resin (A), so that a foamed molding product having homogeneous and fine uniform closed cells can be obtained.

Examples of the crosslinking auxiliaries (D) suitable for use in the crosslinking of the above propylene resin (A) include p-quinone dioxime, p,p'-dibenzoylquinone dioxime, N-methyl-N,4-dinitrosoaniline, nitrobenzene, diphenylguanizine, trimethylolpropane-N,N'-m-phenylenedimaleimide, divinylbenzene (DVB), triallyl cyanurate (TAC), triallyl isocyanurate (TAIC), polyfunctional methacrylate monomers such as ethylene glycol dimethacrylate, diethylene glycol dimethacrylate, polyethylene glycol dimethacrylate, trimethylolpropane trimethacrylate and allyl methacrylate, and polyfunctional vinyl monomers such as vinyl butyrate and vinyl stearate.

The presence of the above crosslinking auxiliary (D) renders homogeneous and mild crosslinking reaction feasible. In the present invention, divinylbenzene (DVB) and triallyl isocyanurate (TAIC) are preferred.

This crosslinking auxiliary (D) is contained in the above foamable sheet forming composition composed mainly of the propylene resin (A) in an amount of 0.1 to 5 parts by weight and preferably 0.3 to 2 parts by weight per 100 parts by weight of the total of the propylene resin (A) and glass fiber (B). When the amount of the crosslinking auxiliary (D) is within the above range, the crosslinking reaction of the propylene resin (A) is appropriately advanced to give a desired crosslinking degree, so that the viscoelasticity at a molten state can be satisfactorily improved with the favorable result that the desired foaming is performed.

The foaming agent (E) for use in the foamable sheet forming composition is not particularly limited as long as it is liquid or solid at room temperature, being a chemical substance which is decomposed by heating to thereby generate a gas, and has a decomposition temperature which is not lower than the melting point of the propylene resin (A).

Examples of the above foaming agents (E) include azodicarbonamide (ADCA), barium azodicarboxylate, N,N'-dinitrosopentamethylenetetramine, 4,4-oxybis (benzenesulfonylhydrazide), diphenylsulfone-3,3'-disulfonyl hydrazide, p-toluenesulfonyl semicarbazide, trihydrazinotriazine, biurea and zinc carbonate. Of these, azodicarbonamide (ADCA), N,N'-dinitrosopentamethylenetetramine and trihydrazinotriazine are preferred which each give off a large amount of gas and have a gas emission completion temperature satisfactorily lower than the heat deterioration initiating temperature of the propylene resin (A).

The above foaming agent (E) is contained in the above foamable sheet forming composition for use in the present invention in an amount of 2 to 5 parts by weight per 100 parts by weight of the total of the propylene resin (A) and glass fiber (B). When the amount of the foaming agent (E) is within the above range, the amount of the gas generated is appropriately controlled, so that the expansion ratio of 5 to 10 mainly along the direction of the thickness thereof can be attained and foams are homogeneously dispersed with uniform size. Further, when the expansion ratio is excessively increased by increasing the crosslinking degree, the sheet is foamed in three-dimensional directions with the result that it is no longer available as a foamed base material for roof.

The foamable sheet forming composition for use in the present invention can contain various additives besides the above various components. For example, a phenolic heat stabilizer having at least 30 carbon atoms can be added to the foamable sheet forming composition in an amount of 0.05 to 1% by weight and preferably 0.1 to 0.5% by weight at the time of mixing the glass fiber (B), radical initiator (C), crosslinking auxiliary (D) and foaming agent (E) together with the propylene resin (A) with the result that not only is the concentration of generated polymer radicals regulated so as to increase the crosslinking efficiency but also the oxidative deterioration is prevented at the times of heating the above composition for foaming and thermal processing of the foam and that the product is endowed with an improved heat aging resistance during the use thereof. In view of these effects, the addition of the phenolic heat stabilizer is preferred.

Examples of such heat stabilizers include n-octadecyl 3-(4'-hydroxy-3',5'-di-t-butylphenyl)propionate, 1,1,3-tris (2-methyl-4-hydroxy-5-t-butylphenyl)butane, 1,3,5-tris(4-t-butyl-3-hydroxy-2,6-dimethylbenzyl)-s-triazine-2,4,6-(1H,3H,5H)trione, 1,3,5-trimethyl-2,4,6-tris(3,5-di-t-buytl-4-hydroxyphenyl)benzylbenzene, 1,3,5-tris(3,5-di-t-buytl-4'-hydroxybenzyl)-s-triazine-2,4,6-(1H,3H,5H)trione, tetrakis (methylene-3(3,5-di-t-butyl-4-hydroxyphenyl)propionate) methane and mixtures thereof.

Mixing in advance an additive capable of preventing a secondary agglomeration of foaming agent into the foaming agent (E) improves the dispersion of the foaming agent (E) in the foamable sheet forming composition, so that an excellent foam free of bulky cells can be obtained. Examples of such additives include metal soaps and surfactants. In particular, for example, metal salts of stearic acid such as calcium stearate, glycerol monostearate and other substances which are solid at the milling temperature are preferred.

The foamed molding product has a whitish appearance. Thus, when the color is conspicuous at, for example, an end portion of the foamed molding product, this can be coped with by adding a colorant such as carbon black to the foamable sheet forming composition.

Backing Sheet

In the present invention, one side of the foamable sheet obtained from the above foamable sheet forming composition is lined with a backing sheet. Examples of suitable backing sheets include those respectively composed of woolly nylon, polyesters such as polyethylene terephthalate (PET), victoria lawn and glass cloth, which are gas-permeable nonwoven or woven fabrics each having a basis weight of 15 to 100 g/m$^2$ and preferably 20 to 80 g/m$^2$ and which do not melt at the time of decomposition of the foaming agent.

The backing sheet is caused to follow the contour of dies in molding such as draw molding, so that a material which can be extensively elongated both longitudinally and laterally and is well balanced in longitudinal and lateral stretchabilities is preferred.

Cover Sheet

Examples of the cover sheets suitable for use in the present invention include woven or nonwoven fabrics of polyesters, nylons and polypropylene and woven fabrics of natural fibers. The basis weight of each of the above nonwoven fabrics generally ranges from 100 to 300 g/m$^2$. Also, composite materials each produced by laminating a foam of polyurethane, polyethylene, polypropylene or the like to any of the above materials can also be used as cover sheets in the present invention. Moreover, a composite material comprising a leather of a vinyl chloride resin, a thermoplastic elastomer or the like lined with a woven fabric or the like and further a composite material produced by laminating a foam of polyurethane, polyethylene, polypropylene or the like to the above leather can be used as cover sheets in the present invention.

The above foamable sheet during the foaming is in molten state, so that it is bonded with a woven or nonwoven fabric or a foam of open cells by an anchor effect and also bonded with polypropylene by fusion. Thus, no adhesive is required for the bonding.

Process for Production

The process for producing an automotive molded roof material from the above foamable sheet forming composition will be described below.

First, the sheeting of the foamable sheet forming composition can be conducted by, for example, a method comprising mixing and kneading the above foamable sheet forming composition containing various components by means of Brabender mixer or the like and subsequently shaping the composition into a sheet by means of calender rolls or a press or a method comprising mixing the foamable sheet forming composition by means of an extruder and subsequently extruding the composition into a sheet through T dies or circular dies. Of these, the latter method comprising mixing the composition and extruding the same through especially T dies at a temperature lower than the decomposition temperature of the foaming agent (E) is preferred from the viewpoint that both energy consumption and operating time can be shortened and that the flatness and extrudate skin of the sheet are excellent.

The sheeting of the foamable sheet forming composition must be conducted at a temperature at which the foaming agent (E) is not decomposed, as mentioned above. In the use of, for example, azodicarbonamide (ADCA) as the foaming agent (E), the foamable sheet forming composition is preferably sheeted at a temperature of about 160° to 190° C., especially, 165° to 180° C.

The thickness of the foamable sheet not yet foamed is in the range of about 0.5 to 1 mm.

One side of the thus obtained foamable sheet is lined with the above backing sheet so as to integrate these by the conventional method. For example, in the present invention, the lining of the foamable sheet with the backing sheet is preferably be effected by a method in which the foamable sheet forming composition is molded into a sheetlike state, and immediately thereafter, the resultant foamable sheet is pressed together with a backing sheet between a pair of sheeting rolls to thereby integrate (laminate) these into one body, with the favorable result that no specific adhesive is needed.

This lining of the foamable sheet with the backing sheet is advantageous in that not only can any draw-down accompanying the softening of the sheet by heating in the following step be prevented but also the propylene resin (A) composing the foamable sheet can be foamed mainly along the direction of the thickness of the sheet, so that a molding product having an expansion ratio of at least 3, especially, as high as 5 to 10 can be obtained.

Thereafter, the foamable sheet lined and integrated with the backing sheet is irradiated with ionizing radiation to thereby crosslink the propylene resin (A).

For example, $\alpha$-, $\beta$-, $\gamma$- or X-rays or electron or neutron beams are employed as the ionizing radiation. Of these, electron beams or $\gamma$-rays from cobalt-60 are preferred. It is preferred that the dose of the ionizing radiation range from about 2 to 10 KGy and especially from 3 to 7 KGy so as to cause the gel fraction, as an index of crosslinking degree, of the propylene resin (A) to fall within the range of 1 to 10% by weight and preferably 3 to 7% by weight. When the dose of the ionizing radiation is within the above range, the crosslinking degree of the propylene resin (A) is appropriately controlled with the favorable result that the desired foaming degree is obtained and the foams are arranged mainly along the direction of the thickness of the sheet. Furthermore, a trimming portion of the sheet can be recycled, for example, it can advantageously be used by mixing with a virgin resin for the automotive molded roof material.

The gel fraction employed herein as an index of the crosslinking degree of the propylene resin (A) is determined in the following manner.

3 g of a sample was put in a 100-mesh screen cage and extracted with p-xylene for 3 hr by using Soxhlet's extractor. A ratio of extraction residue (ratio of xylene insoluble parts) was measured as the gel fraction used herein.

The foamed polypropylene molding product of the present invention can be obtained by heating the thus crosslinked foamable sheet with backing sheet and molding it into a desired shape. At this stage, naturally, the heating must be made at a temperature not lower than the decomposition temperature of the foaming agent (E).

The heating of the foamable sheet to thereby foam the same can be conducted by any of the following methods:

(1) method utilizing radiant heat emitted from a heating element;

(2) method of heating by high frequency induction;

(3) method of heating with the use of an oven; and (4) method of heating with hot air.

Although the foamable sheet foams mainly along the direction of the thickness thereof, it tends to shrink upon being heated, so that the edges of the sheet must be clamped. The sheet is shaped while the foaming is just occurring or while the sheet holds its plasticity though the foaming has nearly been completed. The shaping is conducted by press molding.

A nonwoven fabric of polyester is generally used as the cover sheet. This cover sheet is placed on an upper surface of the sheet while the sheet holds its plasticity though the foaming has been completed and introduced in vertically met roof dies. The dies are closed to thereby attain not only lamination and integration of the sheet and cover sheet but also the shaping. The dies are provided with a cooling water channel and cooled with the use of a chiller or the like. The cover sheet is free from heating with a heater, so that it is free from change in thickness and appearance and does not suffer from fur collapse when the cover sheet is a fur-transplanted sheet (e.g., a fuzzy sheet and velvet) with the result that a skin surface of excellent feeling can be obtained.

A suitable clearance between a pair of dies is about 1 to 2 mm smaller than the foam thickness of the foamed sheet plus the thickness of the cover sheet. The clearance may be minimized at the edge of the foamed sheet so as to flatten the foamed resin there, thereby facilitating trimming thereof.

The thus obtained automotive molded roof material of the present invention which is composed of the cover sheet, the foamed sheet and the backing sheet piled one upon another in this order is lightweight, having high rigidity, and excellent in skin surface feeling, because the excellent surface conditions are maintained.

EFFECT OF THE INVENTION

The process for producing an automotive molded roof material according to the present invention comprises sheeting a foamable sheet forming composition comprising a propylene resin (A), a glass fiber (B), a radical initiator. (C), a crosslinking auxiliary. (D) and a foaming agent (E) into a foamable sheet, lining one side of the foamable sheet with a backing sheet so as to integrate these and irradiating the foamable sheet with ionizing radiation to thereby crosslink the propylene resin (A). Therefore, it does not occur that the foaming agent (E) is decomposed at the time of crosslinking to thereby foam the propylene resin (A). Further, the longitudinal and lateral expansions of the sheet attributed to foaming are suppressed with the foaming and expansion occurring mainly along the direction of the thickness of the sheet. Accordingly, a foamed polypropylene molding product having homogeneous and fine closed cells of uniform size can be obtained by heating the foamable sheet after the crosslinking of the propylene resin (A). Moreover, this foamed polypropylene molding product is prepared from the foamable sheet forming composition containing a propylene block copolymer in which the amounts of crystalline polypropylene and ethylene/propylene copolymer segments are regulated, so that it has a foamed sheet layer foamed mainly along the direction of the thickness thereof at an expansion ratio of 5 to 10 with the result that a lightweight molded roof of high rigidity can be obtained. Further, this molded roof material not only is excellent in dimensional stability, acoustic characteristic, molding environment, designability, skin surface feeling, mounting workability and recyclability but also ensures molding freedom and low cost.

Consequently, the automotive molded roof material of the present invention not only is lightweight, having high rigidity, and excellent in dimensional stability, acoustic characteristic, molding environment, designability, mounting workability, recyclability and skin surface feeling but also ensures molding freedom and low cost.

The present invention will further be illustrated with reference to the following Examples, which in no way limits the scope of the invention.

PREFERRED EMBODIMENTS

Example 1.

The components consisting of:

25 parts by weight of a propylene block copolymer (MFR: 2.0 g/10 min, ethylene content; 20 mol %, ethylene/propylene copolymer segment (intrinsic viscosity ($\eta$) : 13 dl/g) : 10% by weight, crystalline polypropylene segment (86.7% by weight of crystalline polypropylene and 13.3% by weight of crystalline polyethylene) : 90% by weight), 60 parts by weight of a propylene polymer having an MFR of 2.0 g/10 min, 21.5 parts by weight of a glass fiber master batch composed of a glass fiber (70% by weight) of 10 mm in length having an average fiber diameter of 13 μm which is coated by extruding with a modified polypropylene (30% by weight) obtained by graft polymerization with maleic anhydride (0.6% by weight based on the weight of the modified polypropylene), and further, per 100 parts by weight of the total of the above block copolymer, propylene polymer and glass fiber.

0.05 part by weight of 2,5-dimethyl-2,5-di(t-butylperoxy) hexyne-3 as a radical initiator, 1.0 part by weight of divinylbenzene (DVB) as a crosslinking auxiliary, 0.1 part by weight of tetrakis(methylene-3-(3',5'-di-t-butyl-4'-hydroxyphenyl)propionate)methane (Irganox 1010 (trade name) produced by Japan Ciba-Geigy) as an antioxidant, 0.1 part by weight of calcium stearate, and 3.0 parts by weight of azodicarbonamide (ADCA) as a foaming agent, were mixed together by means of a high-speed mixer (Henschel mixer).

The resultant mixture was melted at 170° C. and granulated by the use of a twin-screw extruder having a screw diameter of 50 mm, thereby obtaining pellets of unfoamed homogeneous mixture.

The pellets were shaped at 175° C. by means of a sheeting machine provided with a screw of 90 mm in diameter and with T-dies each of 1800 mm in width into a foamable sheet of 0.8 mm in thickness. One side of this foamable sheet was lined with a backing sheet composed of a nonwoven fabric of polyester (PET) having a basis weight of 30 g/m².

The obtained foamable sheet was irradiated with γ-rays (Co-60) at a dose of 3 KGy to thereby effect crosslinking. The thus crosslinked foamable sheet had an MFR (230° C.) of 3.0 g/10 min and a gel fraction (ratio of xylene insoluble parts) of 3.5% as measured by treating with boiling p-xylene for 3 hours.

The foamable sheet was cut into a sheet having a size of 1500 mm×1300 mm. The four edges thereof were clamped and the foamable sheet was heated by a far infrared heater in the state of having its backing sheet side down. The temperature conditions of the heater were set so as to have its upper heater controlled at 400° C. and to have its lower heater disposed opposite thereto, i.e., disposed on the backing sheet side controlled at 300° C. The heating for 85 sec foamed the sheet. The obtained foamed sheet had a thickness of 5.6 mm and an expansion ratio of 7.

A nonwoven fabric of polyester having a basis weight of 250 g/m² as a roof cover sheet was placed on the upper surface of the resultant foamed sheet before the cooling to solidification thereof and introduced between vertically met aluminum-made roof dies to thereby effect press molding. The dies were cooled with circulating water. The molded roof material composed of the foamed sheet and cover sheet integrated together was cooled to solidify within 1 min. One minute later, the dies were opened and the molded roof material was taken out therefrom. The die clearance was set at 0 at the edges of the roof material, so that the foamed resin was collapsed to have a small thickness there, thereby enabling easy cutting with a cutter. Further, there was little resin at the edges, so that the side view of the appearance showed the presence of only the backing sheet and the cover sheet at the edges. The die clearance at the parts other than the edges was so set that the thickness was equal to the thickness of the foamed sheet and pressed cover sheet minus 1.5 mm, and press molding was effected to thereby obtain a composite integrated molding product (molded roof material) having a thickness of 5.1 mm. The thickness of the base material only was 4.3 mm. The pressing was conducted at a pressure as extremely low as 5 kg/cm².

Thus, the avoidance of direct heating of the cover sheet and further the employment of extremely low pressing pressure led to the appearance of the cover sheet free of fur collapse and ensuring excellent feeling.

The obtained molded roof material was secured to the roof part of an automobile and a wet thermal test was conducted under the below described conditions. The test result showed that the roof sag was not greater than 10 mm and neither deformation nor appearance abnormality was observed, thereby demonstrating that the roof material cleared the automaker standards.

Wet Thermal Test

The molded and finished roof material was secured to a sheet metal model automobile roof, and a wet thermal test was conducted under the below described conditions. The position of the roof material prior to the test was compared with that of the roof material after the test. When the difference (extent of roof sag) was not greater than 10 mm, success was declared. Further, examination was made as to whether or not the roof material after the wet thermal test had suffered from noticeable deformation or whether or not the cover sheet had suffered from peeling or discoloration.

Test Conditions

A 4-cycle test was conducted in which one cycle consisted of heating at 90° C. for 4 hr, allowing to stand still at room temperature for 0.5 hr, cooling at −40° C. for 7.5 hr, allowing to stand still at room temperature for 0.5 hr, heating at 50° C. in 95% RH for 3 hr and allowing to stand still at room temperature for 0.5 hr.

Free foaming was conducted and the thickness and expansion ratio of the resultant foamed sheet were measured in the following manner.

The four edges of the foamable sheet were clamped and the foamable sheet was heated with an up and down heating heater to thereby foam the same. The resultant foamed sheet was subjected to forced cooling by means of an air fan to thereby effect solidification. The average thickness of the foamed sheet after solidification at the center thereof was designated as "the thickness of the foamed sheet obtained by free foaming". The quotient of the thickness of the obtained foamed sheet divided by the thickness of the sheet prior to foaming (foamable sheet) was designated as "the expansion ratio of the foamed sheet obtained by free foaming".

Furthermore, press molding was conducted and the thickness and expansion ratio of the foamed sheet structuring the foamed molding product were measured in the following manner.

Before solidification of the above foamed sheet, a cover sheet was placed on the sheet and subjected to press molding by means of roof dies, followed by cooling to solidification. The cover sheet was peeled from the central flat part of the resultant foamed molding product (molded roof), and the thickness of the thus obtained foamed sheet only was measured. The quotient of the thickness of the obtained foamed sheet divided by the thickness of the foamable sheet was designated as "the expansion ratio of the foamed sheet of the foamed molding product obtained by press molding".

The results are given in Table 1.

Example 2

A molded roof material was prepared and tested in the same manner as in Example 1, except that 85 parts by weight of a propylene block copolymer {MFR: 2.0 g/10 min, ethylene content: 8 mol %, ethylene/propylene copolymer segment (intrinsic viscosity (η): 3.0 dl/g): 8% by weight, crystalline polypropylene segment (98.4% by weight of crystalline polypropylene and 1.6% by weight of crystalline polyethylene): 92% by weight} was substituted for the 25 parts by weight of propylene block copolymer and that no propylene polymer was used.

The results together with those of Comparative Example 2 are given in Table 2.

Example 3

A molded roof material was prepared and tested in the same manner as in Example 1, except that 15 parts by weight of a propylene block copolymer {MFR: 6.0 g/10 min, ethylene content: 26 mol %, ethylene/propylene copolymer segment (intrinsic viscosity (η): 3 dl/g): 22% by weight, crystalline polypropylene segment (91% by weight of crystalline polypropylene and 9% by weight of crystalline polyethylene): 78% by weight} was substituted for the 25 parts by weight of propylene block copolymer and that the propylene polymer was added in an amount of 70 parts by weight.

The results are given in Table 1.

Example 4

A molded roof material was prepared and tested in the same manner as in Example 1, except that the amounts of the propylene polymer and glass fiber coated with the modified polypropylene were changed to 70 and 7.1 parts by weight, respectively.

The results are given in Table 1.

Example 5

A molded roof material was prepared and tested in the same manner as in Example 1, except that the amounts of the propylene block copolymer and glass fiber coated with the modified polypropylene were changed to 20 and 28.6 parts by weight, respectively.

The results are given in Table 1.

Example 6

A molded roof material was prepared and tested in the same manner as in Example 1, except that the dose of γ-rays was changed to 7 KGy.

The results are given in Table 1.

Example 7

A molded roof material was prepared and tested in the same manner as in Example 1, except that a cover sheet obtained by laminating a leather of thermoplastic olefin elastomer of 0.2 mm in thickness to polypropylene foam of 3 mm in thickness (PPAM 25030 (trade name) having an expansion ratio of 25, produced by Toray Industries, Inc.) by fusion and needling the resultant double-layer laminate was substituted for the cover sheet of Example 1.

The results are given in Table 1.

Comparative Example 1

A molded roof material was prepared and tested in the same manner as in Example 1, except that the amounts of the propylene block copolymer and propylene polymer were changed to 0 and 85 parts by weight, respectively.

The results are given in Table 1.

Comparative Example 2

A molded roof material was prepared and tested in the same manner as in Example 1, except that the amounts of the propylene block copolymer and propylene polymer were changed to 85 and 0 part by weight, respectively.

The results are given in Table 1 and further given, together with those of Example 2, in Table 2.

Comparative Example 3

A molded roof material was prepared and tested in the same manner as in Example 1, except that the amounts of the propylene polymer and glass fiber coated with the modified polypropylene were changed to 75 and 0 part by weight, respectively.

The results are given in Table 1.

Comparative Example 4

A molded roof material was prepared and tested in the same manner as in Example 1, except that the amounts of the propylene polymer and glass fiber coated with the modified polypropylene were changed to 45 and 42.9 part by weight, respectively.

The results are given in Table 1.

Comparative Example 5

A molded roof material was prepared and tested in the same manner as in Example 1, except that 15 parts by weight of talc was substituted for the 21.5 parts by weight of glass fiber coated with the modified polypropylene.

The results are given in Table 1.

Comparative Example 6

A molded roof material was prepared and tested in the same manner as in Example 1, except that the irradiation with γ-rays was omitted.

The results are given in Table 1.

Comparative Example 7

A molded roof material was prepared and tested in the same manner as in Example 1, except that the dose of γ-rays was changed to 20 KGy.

The results are given in Table 1.

Comparative Example 8

A molded roof material was prepared and tested in the same manner as in Example 1, except that 15 parts by weight of a propylene block copolymer {MFR: 24 g/10 min, ethylene content: 26 mol %, ethylene/propylene copolymer segment (intrinsic viscosity (η): 4 dl/g): 22 parts by weight, crystalline polypropylene segment (91% by weight of crystalline polypropylene and 9% by weight of crystalline polyethylene:78% by weight)} was substituted for the 25 parts by weight of propylene block copolymer and that 70 parts by weight of a propylene polymer having an MFR of 25 g/10 min was substituted for 60 parts by weight of the propylene polymer of Example 1.

The results are given in Table 1.

TABLE 1

(1)

| | Propylene block copolymer | | | | | Propylene polymer | | Glass fiber before coating with modified propylene content * |
|---|---|---|---|---|---|---|---|---|
| | MFR (g/10 min) | Ethylene Content (mol %) | EP Co-polymer Segment Content (% by wt.) | Crytstal-line polypro-pylene Content (% by wt.) | Content * | MFR (g/10 min) | Content * | |
| Ex. 1 | 2.0 | 20 | 10 | 90 | 25 | 2.0 | 60 | 15 |
| Ex. 3 | 6.0 | 26 | 22 | 78 | 15 | 2.0 | 70 | 15 |
| Ex. 4 | 2.0 | 20 | 10 | 90 | 25 | 2.0 | 70 | 5 |
| Ex. 5 | 2.0 | 20 | 10 | 90 | 20 | 2.0 | 60 | 20 |
| Ex. 6 | 2.0 | 20 | 10 | 90 | 25 | 2.0 | 60 | 15 |
| Ex. 7 | 2.0 | 20 | 10 | 90 | 25 | 2.0 | 60 | 15 |

TABLE 1-continued (I)

| | Propylene block copolymer | | | | Propylene polymer | | Glass fiber before coating with modified propylene content * |
|---|---|---|---|---|---|---|---|
| | EP Copolymer MFR (g/10 min) | Ethylene Content (mol %) | EP Co-polymer Segment Content (% by wt.) | Crystalline polypropylene Content (% by wt.) | Content * | MFR (g/10 min) | Content * | |
| Comp Ex. 1 | — | — | — | — | 0 | 2.0 | 85 | 15 |
| Comp Ex. 2 | 2.0 | 20 | 10 | 90 | 85 | — | 0 | 15 |
| Comp Ex. 3 | 2.0 | 20 | 10 | 90 | 25 | 2.0 | 75 | 0 |
| Comp Ex. 4 | 2.0 | 20 | 10 | 90 | 25 | 2.0 | 45 | 30 |
| Comp Ex. 5 | 2.0 | 20 | 10 | 90 | 25 | 2.0 | 60 | Talc 15 |
| Comp Ex. 6 | 2.0 | 20 | 10 | 90 | 25 | 2.0 | 60 | 15 |
| Comp Ex. 7 | 2.0 | 20 | 10 | 90 | 25 | 2.0 | 60 | 15 |
| Comp Ex. 8 | 24 | 26 | 22 | 78 | 15 | 25 | 70 | 15 |

Note: *(parts by weight)

TABLE 1

(II)

| | Dose of γ-rays (KGy) | Gel fraction (wt. %) | Cover sheet | Thickness of foamable sheet (mm) | Foamed sheet obtd. by free foaming Thickness (mm) | Expans. ratio (thickness/thickness) |
|---|---|---|---|---|---|---|
| Ex. 1 | 3.0 | 3.5 | nonwoven fabric | 0.8 | 5.6 | 7.0 |
| Ex. 3 | 3.0 | 2.8 | nonwoven fabric | 0.8 | 5.2 | 6.5 |
| Ex. 4 | 3.0 | 3.6 | nonwoven fabric | 0.8 | 6.0 | 7.5 |
| Ex. 5 | 3.0 | 3.5 | nonwoven fabric | 0.8 | 5.1 | 6.4 |
| Ex. 6 | 7.0 | 5.5 | nonwoven fabric | 0.8 | 5.5 | 6.9 |
| Ex. 7 | 3.0 | 3.4 | TPO/PPF | 0.8 | 5.6 | 7.0 |
| Comp Ex. 1 | 3.0 | less than 1 | nonwoven fabric | 0.8 | 6.0 | 7.5 |
| Comp Ex. 2 | 3.0 | 22 | nonwoven fabric | 0.8 | 2.8 | 3.5 |
| Comp Ex. 3 | 3.0 | 3.5 | nonwoven fabric | 0.8 | 5.8 | 7.3 |
| Comp Ex. 4 | 3.0 | 4.6 | nonwoven fabric | 0.8 | 3.0 | 3.7 |
| Comp Ex. 5 | 3.0 | 3.3 | nonwoven fabric | 0.8 | 5.9 | 7.4 |
| Comp Ex. 6 | 0 | less than 1 | nonwoven fabric | 0.8 | 2.4 | 3.0 |
| Comp Ex. 7 | 20 | 25 | nonwoven fabric | 0.8 | 2.4 | 3.0 |
| Comp Ex. 8 | 3.0 | 1.5 | nonwoven fabric | 0.8 | 4.8 | 6.0 |

Note: "TPO/PPF" appearing in the column "cover sheet" for Example 7 means a double-layer laminate composed of a leather of thermoplastic olefin elastomer and polypropylene foam.

TABLE 1

(III)

| | Thickness of entire foamed molding obtd. by pressing (mm) | Foamed sheet of foamed molding obtd. by pressing Thickness (mm) | Expansion ratio (thickness/thickness) | Sag of molded roof mat'l obsvd. after wet thermal test | |
|---|---|---|---|---|---|
| Ex. 1 | 5.1 | 4.3 | 5.4 | success | |
| Ex. 3 | 4.7 | 4.1 | 5.1 | success | |
| Ex. 4 | 5.2 | 4.8 | 6.0 | success | |
| Ex. 5 | 4.5 | 3.9 | 4.9 | success | |
| Ex. 6 | 4.9 | 4.2 | 5.3 | success | |
| Ex. 7 | 5.5 | 4.3 | 5.4 | success | |
| Comp Ex. 1 | 2.6 | 2.0 | 2.5 | failure | extensive cell collapse |
| Comp Ex. 2 | 3.0 | 2.4 | 3.0 | failure | poor foam thickness |
| Comp Ex. 3 | 5.2 | 4.6 | 5.7 | failure | poor heat resistance |
| Comp Ex. 4 | 3.2 | 2.6 | 3.2 | failure | poor foam thickness |
| Comp Ex. 5 | 5.3 | 4.7 | 5.9 | failure | poor heat resistance |
| Comp Ex. 6 | 2.6 | 2.0 | 2.5 | failure | poor foam thickness |
| Comp Ex. 7 | — | — | — | 3-dimensional foaming | roof molding unfeasible |
| Comp Ex. 8 | 2.7 | 2.1 | 2.6 | failure | extensive cell collapse |

TABLE 2

|  | Example 2 | Comparative Example 2 |
|---|---|---|
| Propylene block copolymer | | |
| MFR (g/10 min.) | 2.0 | 2.0 |
| Ethylene content (mol %) | 8 | 20 |
| EP copolymer segment content (% by wt.) | 8 | 10 |
| Crystalline polypropylene segment content (% by wt.) | 92 | 90 |
| Content (parts by wt.) | 85 | 85 |
| Propylene polymer | | |
| MFR (g/10 min.) | — | — |
| Content (parts by wt.) | 0 | 0 |
| Glass fiber (parts by wt.) | 15 | 15 |
| Dose of γ-rays (KGy) | 3.0 | 3.0 |
| Gel fraction (wt. %) | 6.0 | 22 |
| Cover sheet | nonwoven fabric | nonwoven fabric |
| Thickness of foamable sheet (mm) | 0.8 | 0.8 |
| Foamed sheet obtained by free foaming | | |
| Thickness (mm) | 5.5 | 2.8 |
| Expansion ratio (thickness/thickness) | 6.9 | 3.5 |
| Thickness of entire foamed molding obtained by pressing (mm) | 4.9 | 3.0 |
| Foamed sheet of foamed molding obtained by pressing | | |
| Thickness (mm) | 4.3 | 2.4 |
| Expansion ratio (thickness/thickness) | 5.4 | 3.0 |
| Sag of molded roof material observed after wet thermal test | success | failure |
| | | poor molding unfeasible |

What is claimed is:

1. A process for producing an automotive molded roof material which process comprises
   i) forming into a sheet a foamable sheet forming composition comprising
      75 to 95 parts by weight of a propylene resin (A) which is (a) a propylene block copolymer (A-1) comprising from 1.5 to less than 9% by weight of an ethylene/propylene copolymer segment and from more than 91 to 98.5% by weight of a crystalline polypropylene segment, said ethylene/propylene copolymer segment having an intrinsic viscosity (η) of 2 to 8 dl/g as measured in decahydronapthalene at 135° C., said propylene block copolymer (A-1) having an ethylene content of from 1.5 to less than 9 mol %; or (b) a propylene resin composition (A-4) comprising from 15 to less than 30 parts by weight of a propylene block copolymer (A-2) and from more than 70 to 85 parts by weight of a propylene polymer (A-3) in a proportion such that the components (A-2) and (A-3) total 100 parts by weight,
      wherein said propylene block copolymer (A-2) comprises 10 to 30% by weight of an ethylene/propylene copolymer segment and 70 to 90% by weight of a crystalline polypropylene segment, said ethylene/propylene copolymer segment having an intrinsic viscosity (η) of 2 to 8 dl/g as measured in decahydronaphthalene at 135° C., said propylene block copolymer (A-2) having an ethylene content of 10 to 30 mol %, and said propylene polymer (A-3) has a melt flow rate of 0.5 to 20 g/10 min as measured at 230° C. under a load of 2.16 kg in accordance with ASTM D-1238 L; and
      5 to 25 parts by weight of a glass fiber (B) in a proportion such that the components (A) and (B) total 100 parts by weight, said foamable sheet forming composition further comprising 0.01 to 0.1 part by weight of a radical initiator (C), 0.1 to 5 parts by weight of a crosslinking auxiliary (D) and 2 to 5 parts by weight of a foaming agent (E) per 100 parts by weight of the total of the propylene resin (A) and glass fiber (B), at a temperature at which the foaming agent (E) does not decompose;
   ii) contacting one side of the resultant foamable sheet with a backing sheet so as to integrate the foamable sheet with the backing sheet;
   iii) irradiating the foamable sheet with ionizing radiation to crosslink the propylene resin (A);
   iv) thereafter heating the foamable sheet so as to cause the foamable sheet to foam;
   v) placing a cover sheet on the other side of the foamed sheet before the foamed sheet cools to solidify; and
   vi) press molding the cover sheet on the foamed sheet.

2. A process according to claim 1, wherein the crystalline polypropylene segment comprises 80 to 100% by weight of a crystalline polypropylene and 0 to 20% by weight of a crystalline polyethylene.

3. A process according to claim 1 or 2, wherein the propylene resin (A) has a melt flow rate ranging from 0.5 to 20 g/10 min as measured at 230° C. under a load of 2.16 kg in accordance with ASTM D-1238 L.

4. A process according to claim 1, wherein the glass fiber (B) has an average fiber diameter ranging from 5 to 20 μm and a fiber length ranging from 0.1 to 20 mm.

5. A process according to claim 1, wherein the glass fiber (B) is a glass fiber obtained by coating a glass fiber with a modified polypropylene graft-polymerized with an unsaturated carboxylic acid or derivatives thereof.

6. A process according to claim 1, wherein the irradiation with the ionizing radiation is conducted at a dose of 2 to 10 KGy.

7. A process according to claim 1, wherein the foamable sheet after irradiation has a gel fraction ranging from 1 to 10% by weight based on the weight of the propylene resin (A).

8. A process according to claim 1, wherein the foamable sheet is an unfoamed sheet which is caused by heating to foam mainly along the direction of the thickness of the sheet at an expansion ratio of 5 to 10, so that a foamed sheet having a thickness of at least 3 mm is obtained.

9. An automotive molded roof material comprising a crosslinked foamed sheet comprising
   75 to 95 parts by weight of propylene resin (A) which is (a) a propylene block copolymer (A-1) comprising from 1.5 to less than 9% by weight of an ethylene/propylene copolymer segment and from more than 91 to 98.5% by weight of a crystalline polypropylene segment, said ethylene/propylene copolymer segment having an intrinsic viscosity (η) of 2 to 8 dl/g as measured in decahydronaphthalene at 135° C., said propylene block copolymer (A-1) having an ethylene content of from 1.5 to less than 9 mol %; or (b) a propylene resin composition (A-4) comprising from 15 to less than 30 parts by weight of a propylene block copolymer (A-2) and from more than 70 to 85 parts by weight of a propylene polymer (A-3) in a proportion such that the components (A-2) and (A-3) total 100 parts by weight, wherein said propylene block copolymer (A-2) comprises 10 to 30% by weight of an ethylene/propylene copolymer segment and 70 to 90% by weight of a crystalline polypropylene segment, said ethylene/propylene copolymer segment having an intrinsic viscosity ($\eta$) of 2 to 8 dl/g as measured in decahydronapthalene at 135° C., said propylene block copolymer (A-2) having an ethylene content of 10 to 30 mol %, and said propylene polymer (A-3) has a melt flow rate of 0.5 to 20 g/10 min as measured at 230° C. under a load of 2.16 kg in accordance with ASTM D-1238 L; and 5 to 25 parts by weight of a glass fiber (B) in a proportion such that the components (A) and (B) total 100 parts by weight, said crosslinked foamed sheet having a gel fraction from 1 to 10 % by weight based on the weight of the propylene resin (A) and having foam arranged mainly along the direction of the thickness of the sheet at an expansion ratio of 5 to 10.

10. A material according to claim 9, wherein the crosslinked foamed sheet has one side having a cover sheet laminated thereto and the other side having a backing sheet laminated thereto.

* * * * *